United States Patent [19]

Toyama et al.

[11] Patent Number: 5,659,317

[45] Date of Patent: Aug. 19, 1997

[54] APPARATUS FOR REPRODUCING DIGITAL AUDIO WAVEFORM DATA

[75] Inventors: Akira Toyama; Kazuyuki Fujiwara, both of Tokyo, Japan

[73] Assignee: Nippon Precision Circuits Inc., Tokyo, Japan

[21] Appl. No.: 399,327

[22] Filed: Mar. 6, 1995

[30] Foreign Application Priority Data

Mar. 9, 1994 [JP] Japan .................................. 6-038476

[51] Int. Cl.$^6$ ...................................................... H03M 1/66
[52] U.S. Cl. .......................................... 341/144; 455/43
[58] Field of Search ................................ 341/144; 455/43

[56] References Cited

U.S. PATENT DOCUMENTS 4,726,042  2/1988  Vance ...................................... 375/102

*Primary Examiner*—Brian K. Young
*Assistant Examiner*—Peguy Jean Pierre
*Attorney, Agent, or Firm*—Jordan and Hamburg

[57] ABSTRACT

In a waveform data reproducing apparatus for a digital audio system, deterioration of sound quality is prevented by a digital audio waveform data reproducing apparatus which includes a digital preemphasis circuit 12 for digitally preemphasis-processing digital audio waveform data a1 to produce digitally preemphasized data c1, a D/A converter 14 for D/A-converting either the waveform data a1, or the digitally preemphasized data c1, a switch circuit 13 for causing the waveform data a1 to be connected to the D/A converter 14 when the waveform data a1 has been emphasis-processed, and for causing the digitally preemphasized waveform data c1 to be connected to the D/A converter 14 when the waveform data a1 is not emphasis-processed, and an analog deemphasis circuit 14 for analogically deemphasis-processing the output signal from the D/A converter 14.

6 Claims, 3 Drawing Sheets

APPARATUS FOR REPRODUCING DIGITAL AUDIO WAVEFORM DATA

BACKGROUND OF THE INVENTION

1. Field of the Invention

The present invention relates to an apparatus for reproducing waveform data in a digital audio system.

2. Description of the Related Art

In a digital audio system such as CD (compact disk) and DAT (digital audio tape), preemphasis and deemphasis may be performed so as to improve sound qualities. Preemphasis implies that a gain of a signal in a frequency range with relatively low energy and a high audible sensitivity is previously increased and then the preemphasized signal is recorded. Deemphasis implies that the increased gain of this signal in that frequency range is decreased and then the signal with the original gain is reproduced. Levels of noise components contained in the above-described frequency range may be lowered by the preemphasis/deemphasis processing.

There are two different types of waveform data (i.e., digital signals indicative of recorded waveform signal) contained in digital audio data, namely emphasized data and non-emphasized data. As a consequence, conventionally the deemphasis process is carried out at the signal reproducing side in accordance with the following methods.

FIG. 2 is a schematic diagram for showing the first conventional reproducing apparatus. Both the waveform data "a2" and the selection signal "b2" are input into this reproducing apparatus. The data corresponding to the waveform data "a2" and the selection signal "b2" are contained in the digital audio data. After the waveform data "a2" has been digitally processed in the digital processing circuit 21, the digitally processed waveform data is D/A-converted in the D/A converter 22. In the case where the waveform data "a2" has been emphasis-processed, the switch circuit 23 is brought into the ON-state in response to the selection signal "b2", and the analog deemphasis processing is performed in the analog deemphasis circuit 24 to output the analog deemphasized waveform data. To the contrary, when the waveform data "a2" is not emphasis-processed, the switch circuit 23 is brought into the OFF-state in response to the selection signal "b2", so that this waveform data "a2" is output without executing the deemphasis process.

FIG. 3 is a schematic block diagram for representing the second conventional reproducing apparatus. The waveform data "a3" and the selection signal "b3" are input into the digital processing circuit 31. When the waveform data "a3" has been emphasis-processed, the data "c3" which is digitally deemphasis-processed in the digital deemphasis circuit 32 is supplied to the D/A converter 34. To the contrary, when the waveform data "a3" is not emphasis-processed the waveform data "a3" is supplied to the D/A converter 34 in response to the selection signal "b3". Either the waveform data "a3" or the waveform data "c3" is D/A-converted by the D/A converter 34 into the corresponding analog waveform signal which will then be output.

In the above-described first conventional reproducing apparatus, the switch circuit 23 is directly connected to the analog deemphasis circuit 24. As a consequence, in this first conventional reproducing apparatus, there is the problem that the sound quality is deteriorated due to the presence of switch circuit 23.

On the other hand, in the second conventional reproducing apparatus, after the waveform data is digitally deem-phasis processed in the digital deemphasis circuit 32, the deemphasized waveform data is D/A-converted by the D/A converter 34. As a result, since the effect of the emphasis process is not given to the noise produced in the D/A converter 34, the sound quality is deteriorated.

SUMMARY OF THE INVENTION

An object of the present invention is to provide a waveform data reproducing apparatus capable of preventing deterioration in the sound quality of a digital audio system.

In accordance with an aspect of the present invention, an apparatus for reproducing digital audio waveform data includes a digital preemphasis circuit for digitally preemphasis-processing a first signal corresponding to the digital audio waveform data to produce a second signal; a D/A converter for D/A-converting a signal supplied thereto and for producing an output signal in response thereto; a switch circuit for supplying the first signal to the D/A converter when the first signal has been emphasis-processed, and for supplying the second signal to the D/A converter when the first signal has not been emphasis-processed; and an analog deemphasis circuit for analogically deemphasis-processing the output signal of the D/A converter.

Preferably, the switch circuit is formed by a transistor connected between the digital preemphasis circuit and the D/A converter, and is supplied with a select signal corresponding to whether the first signal has been preemphasis-processed. The select signal is included in the first signal.

In accordance with another aspect of the present invention, an apparatus for reproducing digital audio waveform data includes a digital preemphasis circuit for digitally preemphasis-processing a first signal corresponding to the digital audio waveform data to produce a second signal; a D/A converter for D/A-converting a signal supplied thereto and for producing an output signal in response thereto; a switch circuit for supplying the first signal to the D/A converter when the first signal has been emphasis-processed, and for supplying the second signal to the D/A converter when the first signal has not been emphasis-processed, the switch circuit being connected between the digital preemphasis circuit and the D/A converter; and an analog deemphasis circuit connected to an output of the D/A converter for analogically deemphasis-processing the output signal of the D/A converter.

BRIEF DESCRIPTION OF THE DRAWINGS

For a better understanding of the present invention, reference is made to the detailed description to be read in conjunction with the accompanying drawing, in which.

DESCRIPTION OF THE PREFERRED EMBODIMENTS

Figure 1:
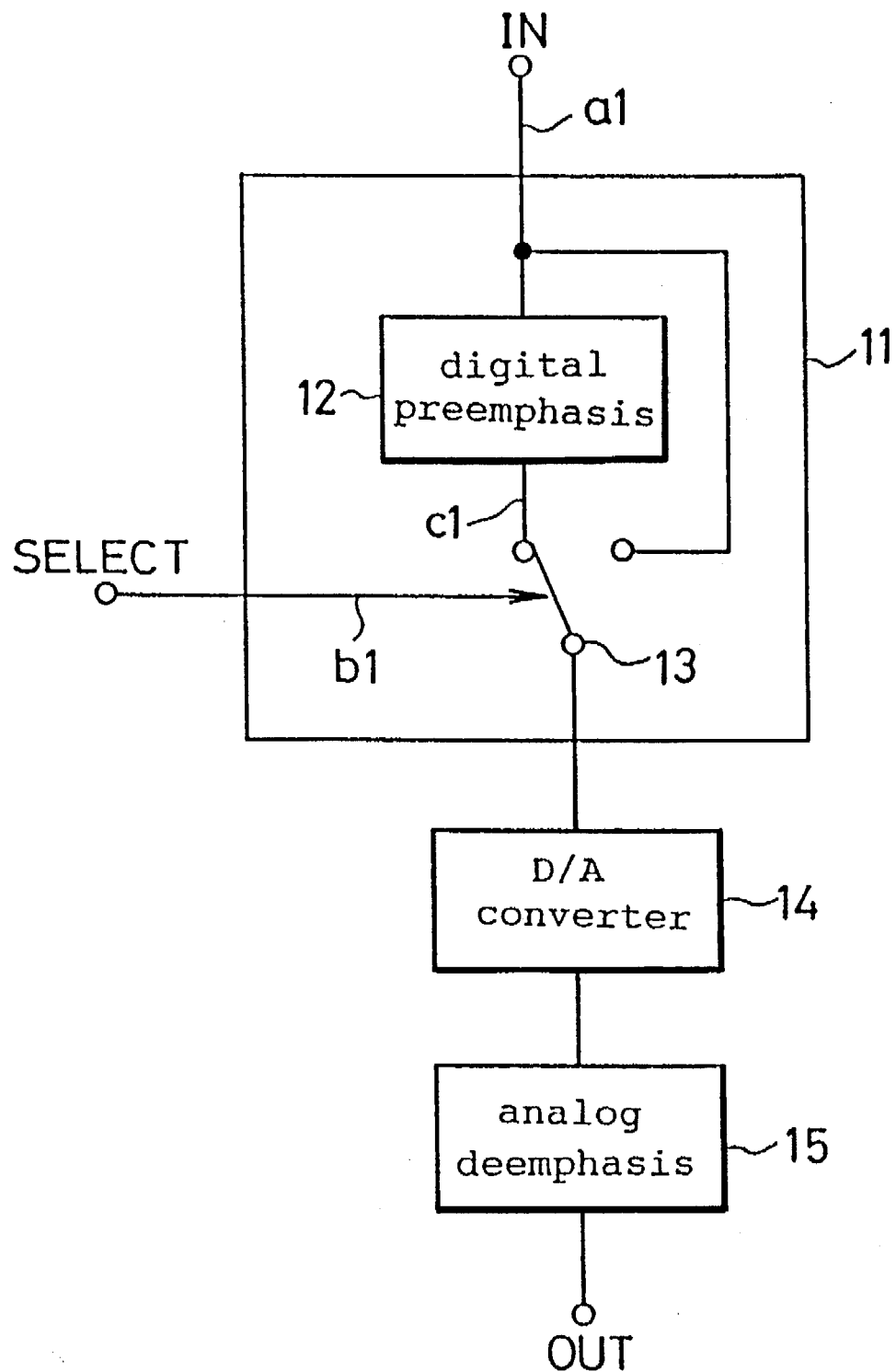
FIG. 1 is a block diagram of a reproducing apparatus according to one embodiment of the present invention.
Figure 2:
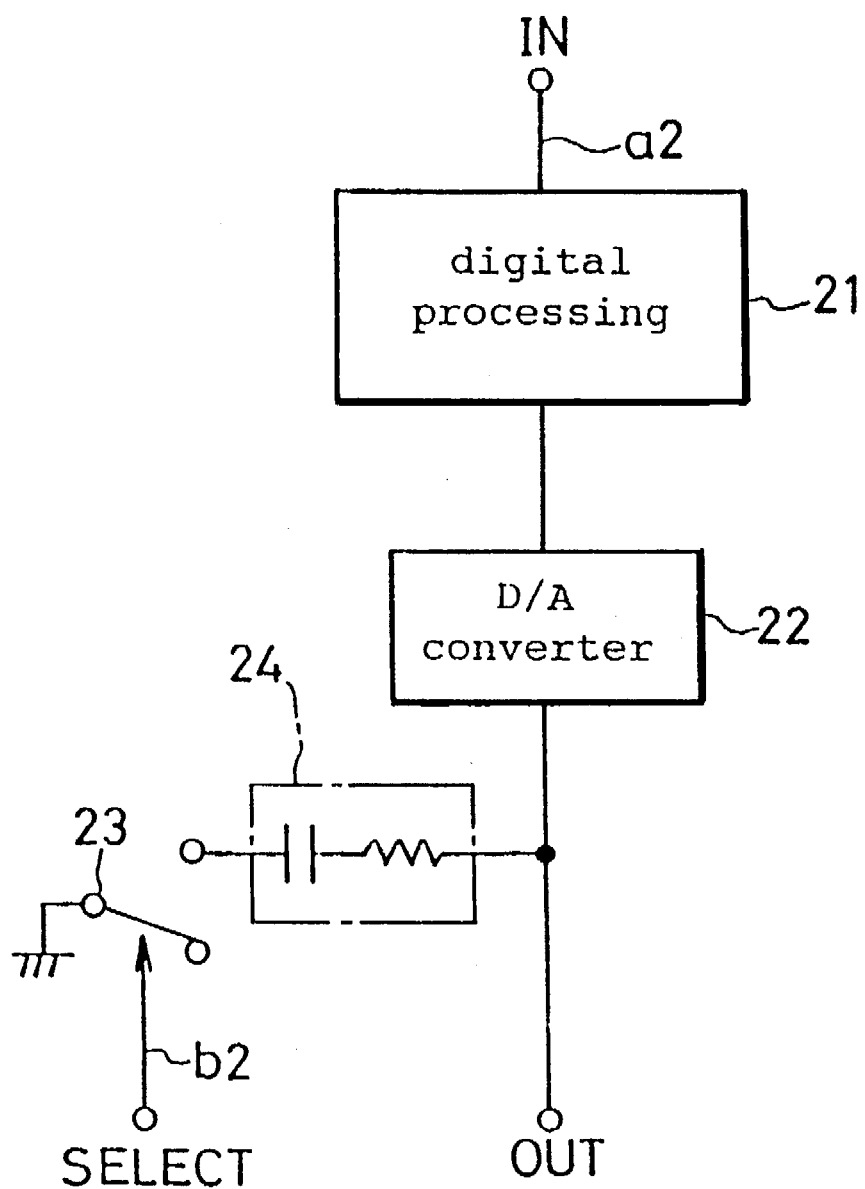
FIG. 2 is a block diagram of a first conventional reproducing apparatus.
Figure 3:
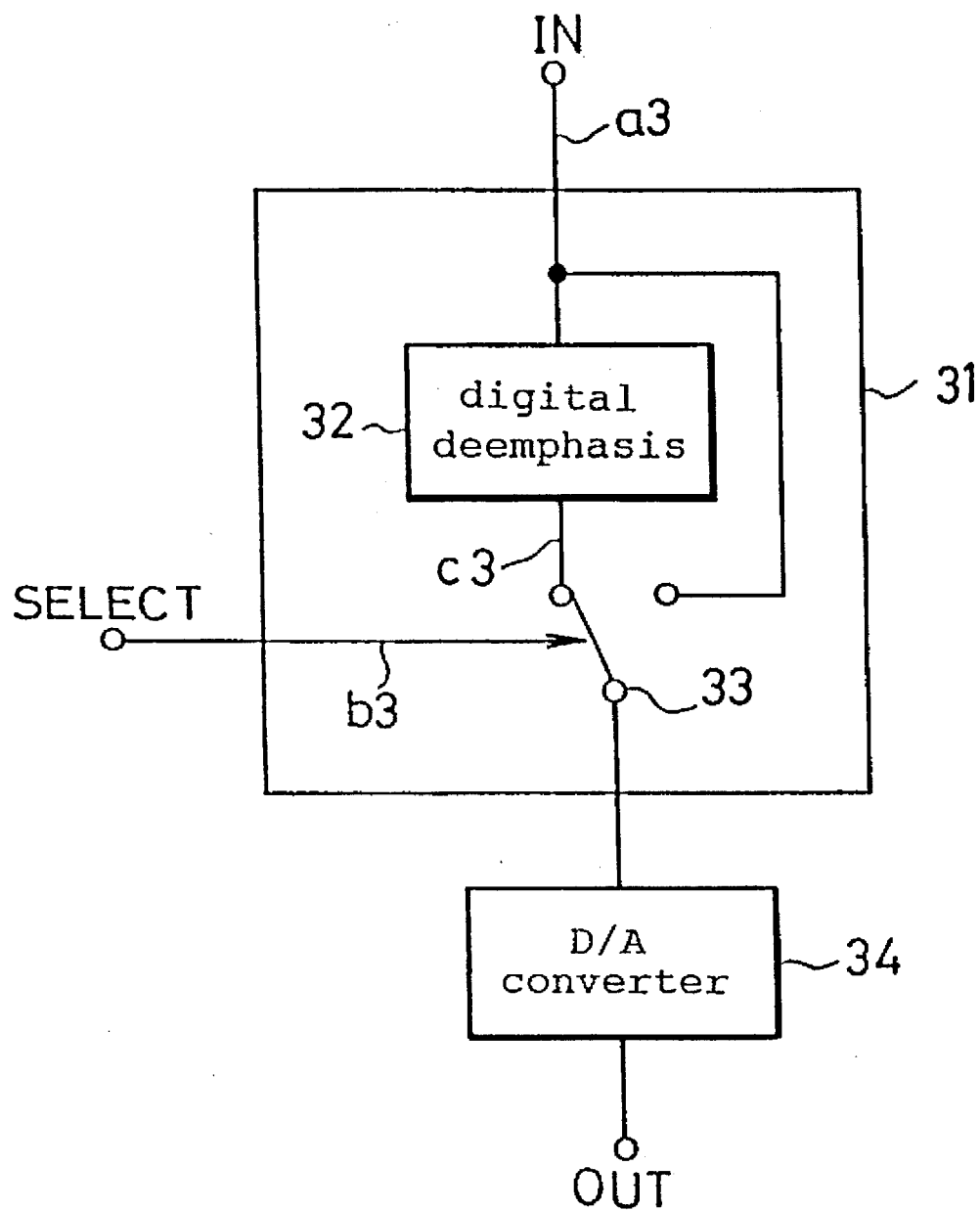
FIG. 3 is a block diagram of a second conventional reproducing apparatus.

In FIG. 1 there is shown a schematic block diagram of an apparatus for reproducing digital audio waveform data in a digital audio system according to one embodiment of the present invention.

The apparatus includes a digital processing circuit 11 including a digital preemphasis circuit 12, and a switch circuit 13 constructed of a transistor or the like and connected to the output of digital preemphasis circuit 12. A D/A converter 14 and an analog deemphasis circuit 15 including a resistive element, a capacitive element and the like, are arranged in series at the output of switch circuit 13.

Both waveform data "a1" and a selection signal "b1" are input into digital processing circuit 11. The waveform data "a1" corresponds to a digital signal indicative of the recorded waveform signal, whereas the selection signal "b1" corresponds to a signal used to select the connection condition of switch circuit 13 based upon whether or not the waveform data "a" is emphasis-processed. The data corresponding to the waveform data "a1" and the selection signal "b1" are contained in the digital audio data which have been stored in the software of the digital audio system such as the CD (compact disk) and DAT (digital audio tape). When the waveform data "a1" is emphasis-processed, the waveform data "a1" is directly supplied to the D/A converter 14 in response to the selection signal "b1". Conversely, when the waveform data "a1" is not emphasis-processed, data "c1" which has been digitally preemphasis-processed in digital preemphasis circuit 12 is supplied to D/A converter 14. An analog signal D/A-converter by D/A converter 14 is analogically deemphasis-processed by analog deemphasis circuit 15, and thereafter the analog deemphasis-processed signal is output.

As previously described, in this preferred embodiment, when the waveform data "a1" is not emphasis-processed, this waveform data is digitally preemphasis-processed by digital preemphasis circuit 12. It should be noted that the emphasis amount of the digital preemphasis processing operation effected in digital preemphasis circuit 12 is equal to the emphasis amount of the waveform data "a1" which has been previously emphasis-processed. As a result, in analog deemphasis circuit 15, even the waveform data "a1" which is not emphasis-processed may be processed in a similar manner to the emphasis-processed data.

In accordance with the present invention, since switch circuit 13 is not directly connected to analog deemphasis circuit 15, analog deemphasis circuit 15 is not adversely influenced by switch circuit 13. Also, since analog deemphasis circuit 15 is located subsequent to D/A converter 14, the effects of the emphasis process can be achieved even for noise produced from D/A converter 14. As a consequence, the sound quality of the waveform data reproducing apparatus according to the present invention can be improved by preventing deterioration in the sound quality.

Having described a specific preferred embodiment of the invention with reference to the accompanying drawings, it will be appreciated that the present invention is not limited to that precise embodiment and that various changes and modifications can be effected by one skilled in the art within the scope and spirit of the invention as claimed.

What is claimed is:

1. An apparatus for reproducing digital audio waveform data, comprising:

a digital preemphasis circuit for digitally preemphasisprocessing a first signal corresponding to the digital audio waveform data to produce a second signal;

a D/A converter for D/Aconverting a signal supplied thereto and for producing an output signal in response thereto;

a switch circuit for supplying said first signal to said D/A converter when said first signal is emphasisprocessed, and for supplying said second signal to said D/A converter when said first signal is not emphasisprocessed; and an analog deemphasis circuit for analogically deemphasisprocessing the output signal of said D/A converter.

2. An apparatus according to claim 1, wherein said switch circuit is formed by a transistor connected between said digital preemphasis circuit and said D/A converter, and said transistor being controlled by a select signal indicating whether said first signal has been preemphasisprocessed.

3. An apparatus according to claim 1, wherein said first signal includes a select signal indicating whether said first signal is preemphasisprocessed, said select signal being supplied to said switch circuit for controlling the supply of one of said first signal and said second signal to said D/A converter.

4. An apparatus for reproducing digital audio waveform data, comprising:

a digital preemphasis circuit for digitally preemphasisprocessing a first signal corresponding to the digital audio waveform data to produce a second signal;

a D/A converter for D/Aconverting a signal supplied thereto to produce an output signal in response thereto;

a switch circuit for supplying said first signal to said D/A converter when said first signal is emphasisprocessed, and for supplying said second signal to said D/A converter when said first signal is not emphasisprocessed, said switch circuit being connected between the digital preemphasis circuit and the D/A converter; and an analog deemphasis circuit connected to an output of the D/A converter for analogically deemphasisprocessing the output signal of said D/A converter.

5. An apparatus according to claim 4, wherein said switch circuit is formed by a transistor connected between said digital preemphasis circuit and said D/A converter, and the transistor being controlled by a select signal indicating whether said first signal has been preemphasisprocessed.

6. An apparatus according to claim 4, wherein said first signal includes a select signal indicating whether said first signal has been preemphasisprocessed, said select signal being supplied to said switch circuit for controlling the supply of one of said first signal and said second signal to said D/A converter.

\* \* \* \* \*